March 18, 1930.  H. O. FLETCHER  1,750,711
SHOCK ABSORBER
Filed Dec. 31, 1924
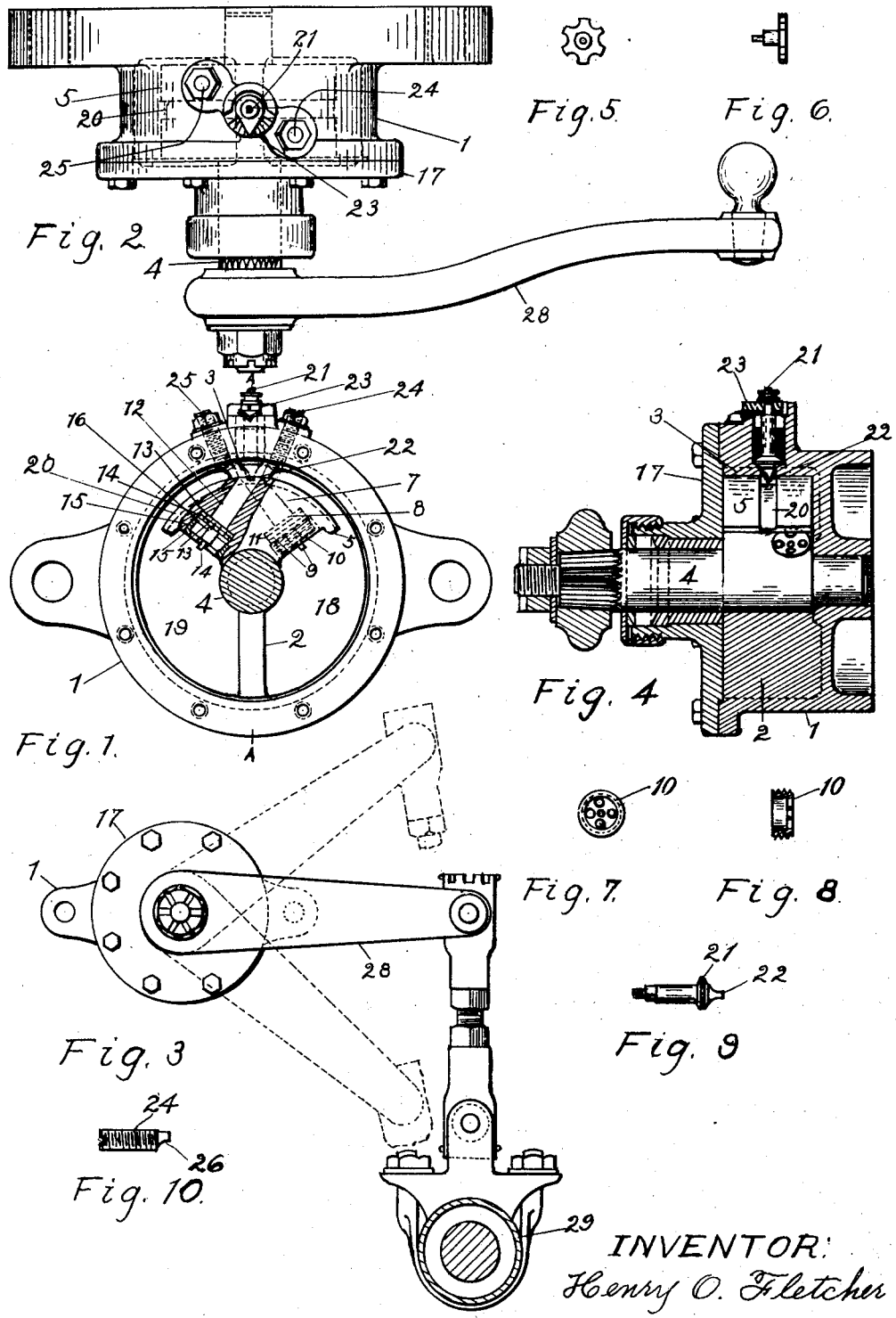
INVENTOR:
Henry O. Fletcher Patented Mar. 18, 1930

1,750,711

UNITED STATES PATENT OFFICE

HENRY O. FLETCHER, OF BRIDGEPORT, CONNECTICUT

SHOCK ABSORBER

Application filed December 31, 1924. Serial No. 759,069.

One object of my invention is to produce a shock-absorber after careful experiments, that will reduce each and every abnormal movement of a vehicle body to a minimum.

Another object is to facilitate the operation of attaching the absorber to the vehicle.

Still other objects are to simplify the construction, to reduce the number of parts, eliminate wear, obviate the possibility of getting out of order, and cheapen cost of manufacture.

In the drawings Fig. 1 is a front elevation, parts being broken away for clearness of illustration. Fig. 2 is a plan view. Fig. 3 is a front elevation showing a method of attaching to a vehicle. Fig. 4 is a sectional elevation taken on line A—A, Fig. 1. Figs. 5, and 6, are end and side elevations respectively of the valve. Figs. 7 and 8 are end and sectional elevations respectively of the valve cage. Figs. 9 and 10 are side elevations respectively of the adjusting pin and adjusting screw.

Referring more especially to Fig. 1 the case or body 1, is provided with the stationary partition 2, and the protruding ledge 3. The shaft 4, is provided with the segmental arm 5, preferably made integral with shaft 4.

The segmental arm 5, is provided on one side with hole 7, counterbored to form valve seat 8, which is engaged by valve 9, when closed. The valve cage 10, is preferably screwed into the counterbored pocket 11, to hold the valve 9, in place and to properly limit its movement.

The hole 12, valve seat 13, valve 14, cage 15, and pocket 16, are provided on the other side of the segmental arm 5, similarly as described above.

The body 1, is filled with a suitable fluid and sealed by the cover 17, so that when the shaft 4, is rocked clockwise from its normal position, as shown in Fig. 1, valve 14, will open allowing the fluid to flow from chamber 18, to chamber 19, in the body 1, the shaft 4, and segmental arm 5, being a close fit between partition 2, and ledge 3, to prevent the fluid flowing between these members. In like manner, when the shaft 4, and arm 5, are rocked anti-clockwise, valve 9, will open allowing the fluid to flow from chamber 19, to chamber 18.

When the segment 5, is rocked clockwise or anti-clockwise, toward its normal position the fluid cannot pass through either valve 9, or valve 14, but is confined to pass through the eccentrically formed groove 20, in the periphery of the segmental arm 5. Therefore, the segmental arm 5, is free to move unchecked in either direction from its normal position after the upper ends of the holes 7 or 12, as the case may be, pass clear of the ledge 3, but is checked in its movements in either direction toward its normal position.

The groove 20, is shallow at either end and deepens toward the middle so that the resistance offered to the movement of the arm 5, toward its normal position is greater at a distance from normal position and progressively decreases as the normal position is approached.

The sides of the adjusting pin 21, is slabbed off on either side at one end to form a thin vane 22, which protrudes into the groove 20, offering very little resistance to the flow of fluid when adjusted parallel to the groove but when turned by the short adjusting arm 23, fast on adjusting pin 21, the vane 22, turns at an angle with groove 20, practically closing it thus adjusting the flow of the fluid and the amount of resistance offered to arm 5, as it approaches from either direction toward normal position. The vane 22, is long enough to nearly touch the bottom of groove 20, at the ends but allows more space for the flow of fluid as the deeper portion of groove 20, is reached.

The holes 7 and 12, where they intersect the surface of arm 5, are elliptical in form owing to their tangential arrangement and hence are slightly wider than the distance between the adjacent sides of the adjusting screws 24 and 25, so that when adjusting screws 24 and 25 are adjusted back to allow open spaces between the ends of these screws and the periphery of arm 5, the valves 9 and 14, will both remain open during the movements for a short distance of arm 5, in either direction, thus providing an unrestricted zone of action in both directions.

When adjusting screws 24 and 25, are both adjusted inward to their extreme position as shown in Fig. 1, their respective tangs 26 will fill in the portions of the holes intersecting the opposite edges of the ledge 3 so as to thus make the effective distance between the said edges considerably greater than the width of holes 7 and 12, which acts to prevent any fluid from flowing by either valve during the movements of arm 5, in either direction which acts to establish a slightly restricted zone during its movements in both directions.

It will be noticed that each of the adjusting screws 24 and 25, are slabbed off on one side, to produce a substantially semi-circular tang 26, as shown in Fig. 10, which are turned toward each other when adjusted to their extreme position thus establishing the extent of the restricted zone spoken of above, but upon turning slightly they will act to shorten the restricted zone, and a quarter turn of either screw will open a half of the width of the hole for the flow of fluid to full back position. Thus to turn adjusting screw 24, a quarter turn will eliminate the part of the restricted zone at the right, and a quarter turn of screw 25, will eliminate the part of the restricted zone at the left Fig. 1.

Thus it will be seen that by adjusting one or both of adjusting screws 24 and 25, that any action of resistance may be accomplished from an unrestricted zone of action in both directions, an unrestricted zone one way and restricted zone the other, to a restricted zone in both directions, all of which have been found desirable to meet the requirements of the various spring suspensions of vehicles.

By the foregoing it will be seen that when the vehicle wheels engage a hole or ridge in the road, that the initial motion of the axle 29, will impart a motion to lever 28, and arm 5, (see dotted lines Fig. 3) away from normal position which is unchecked but when the vehicle body tends to suddenly follow due to the action of the spring that these sudden actions will be suitably checked or modified by the closing of the valves confining the flow of fluid to groove 20, which flow is governed by vane 22, and adjusting screws 24 and 25.

Having described my invention what I claim as new is set forth in the following claims:

1. In a shock absorber, two members relatively movable in relation to each other, one of said members constituting a liquid container and the other member dividing said container into two chambers, means to permit free passage of the liquid from one chamber to the other during the relative movement of the two members in either direction away from their normal position, means to restrict the flow of the liquid to a passage varying in size as they return in either direction toward their normal position, and means to adjust the size of said passage.

2. In a shock absorber, a body comprising two chambers adapted to contain a fluid, an arcuate oscillating piston mounted between said chambers and normally held near central position, valves adapted to allow free flow of fluid from one chamber to the other as the piston moves in either direction away from normal position, and a groove of progressively differentiated cross-sectional area in the periphery of said piston, to allow decreasingly restricted flow of the fluid between the chambers while the piston moves in either direction toward normal position.

3. In a shock absorber, a body comprising two chambers adapted to contain a fluid, an arcuate oscillating piston mounted between said chambers normally held near central position, valves adapted to allow free flow of fluid from one chamber to the other while the piston moves in either direction away from normal position, a groove of progressively differentiated cross-sectional area in the periphery of said piston to allow decreasingly restricted flow of the fluid between the chambers as the piston moves in either direction toward normal position, and means to adjust said restricted flow.

4. In a shock absorber, a body comprising two compartments and adapted to contain a fluid, an oscillating piston mounted between said chambers normally held near its central position, means to retard the movements of said piston by regulating the flow of fluid between the chambers, in either, or both, directions within a predetermined zone at, or near, its normal position and allow free movement in either direction away from said zone, and adjustable means to retard its movements in either direction toward said zone.

5. In a shock absorber, two members normally held within a predetermined zone near their relative central position, means to resist their relative movement in either, or both, directions within said zone and to allow free relative movement in either direction away from said zone, and means to resist their relative movement in either direction toward said zone.

6. In a shock absorber, two members normally held within a predetermined zone near their relative central position, means to resist their relative movement in either, or both, directions within said zone, and means to decreasingly resist their relative movement in either direction toward said zone.

7. In a shock absorber, two members normally held within a zone near their relative central position, means to resist their relative movement in either, or both, directions within said zone, means to resist their relative movement in either direction toward said zone, and means to adjust said resistances.

8. In a shock absorber, a body element comprising two compartments and adapted to contain a fluid, a piston adapted to oscillate between the compartments of the body element, a groove in the surface of the piston adjacent the body element through which the fluid passes from one of said chambers to the other as the piston oscillates in the body element, and a rotatable vane mounted in the body element and extending into said groove to adjust the flow of fluid from one chamber to the other.

In witness whereof I hereunto set my hand.

HENRY O. FLETCHER.